March 12, 1940.   H. E. WEAVER   2,193,184
CONTROL SYSTEM
Filed Jan. 4, 1936   3 Sheets-Sheet 1

INVENTOR.
HARRY E. WEAVER
BY
Raymond W. Junkins
ATTORNEY.

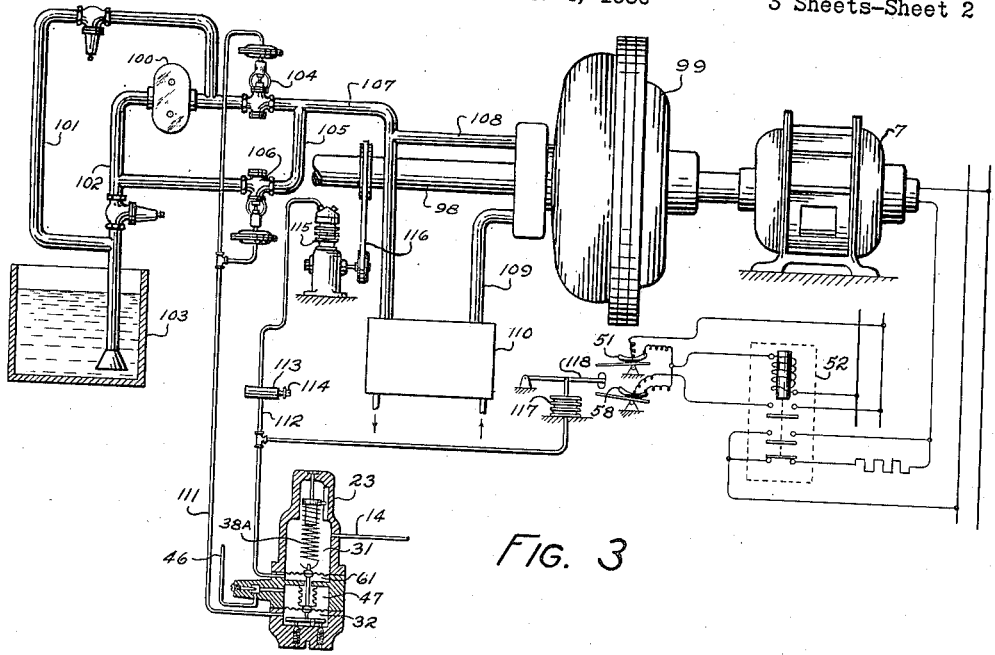
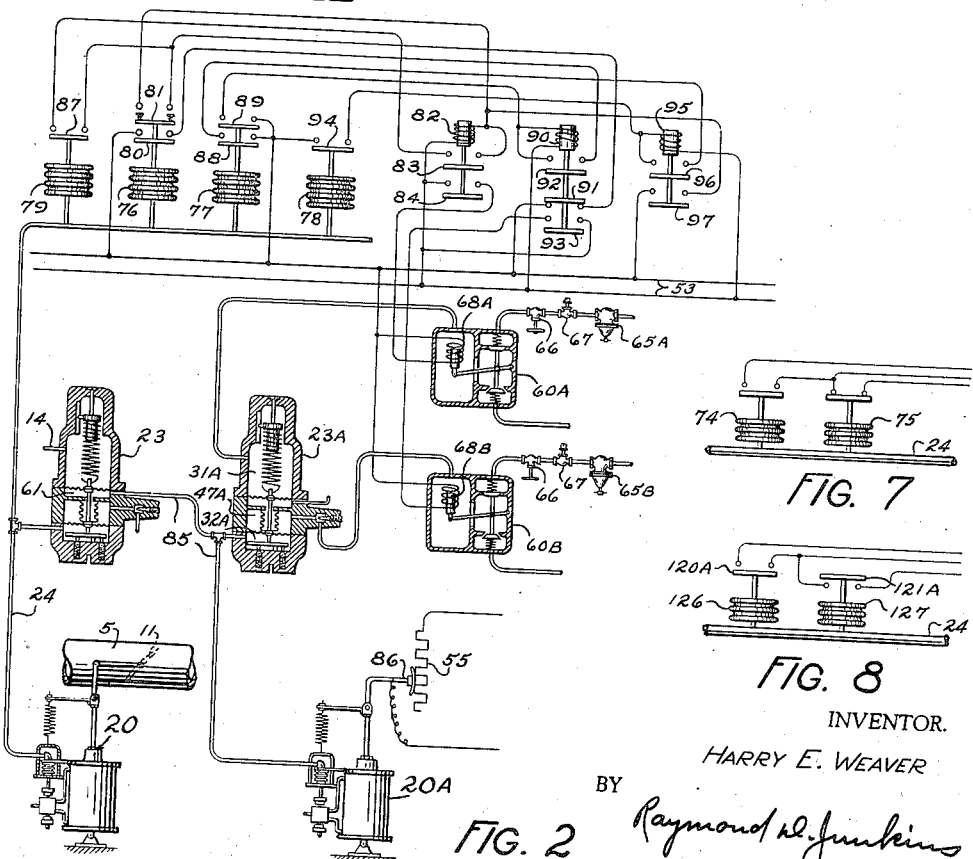

INVENTOR.
HARRY E. WEAVER
BY
Raymond W. Jenkins
ATTORNEY.

Patented Mar. 12, 1940

2,193,184

UNITED STATES PATENT OFFICE 2,193,184

CONTROL SYSTEM

Harry E. Weaver, South Euclid, Ohio, assignor to Bailey Meter Company, a corporation of Delaware Application January 4, 1936, Serial No. 57,556

13 Claims. (Cl. 236—14)

This invention relates to control systems for regulating the rate of application of an agent or agents contributing to the production of a variable to maintain the variable at a predetermined value. More particularly my invention relates to fluid pressure actuated control systems wherein a fluid pressure is established in accordance with the magnitude, or departure from a predetermined magnitude, of a variable; and control of the various agents effected through suitable regulators actuated by the fluid pressure.

One object of my invention is to provide a control system wherein an arbitrary high speed repositioning of the regulators of the various agents is effected upon a change in the rate of operation of the devices supplying the agents.

A further object of my invention is to provide a control system instantly correcting for changes in the rate of operation of an agent supplying device, which changes would otherwise produce an alteration in the rate of agent supply beyond that necessary to maintain the variable at the desired value.

A further object of my invention is to provide a control system wherein, throughout the duration of transient conditions which produce a marked change in the availability of the agents contributing to the production of a controlled condition, a correction is automatically made whereby the rate of supply remains normal.

Still another object of my invention is to provide a control system embodying certain safety features to prevent the establishment of dangerous or hazardous conditions.

A further object of my invention is to provide a control system wherein an abnormal change in the rate of supply of one agent immediately effects a corresponding change in the rate of supply of other agents, so that the desired inter-relation between the agents is continuously maintained.

A more specific object of my invention is to provide a control system wherein upon a change in fan speed, which for example forms a part of the air supply means of a vapor generator, the damper regulating the rate of air supply is immediately positioned so that the rate of air supply during and after the change in speed is substantially the same as before the change.

Further objects will be apparent from the following description and from the drawings, in which:

Fig. 2 is a modification of my invention as illustrated in Fig. 1.

Fig. 3 is a further modification of my invention applied to an alternate form of air supply means.

Figs. 7 and 8 illustrate substitute forms of switches which may be used with my control system.

Figure 1:
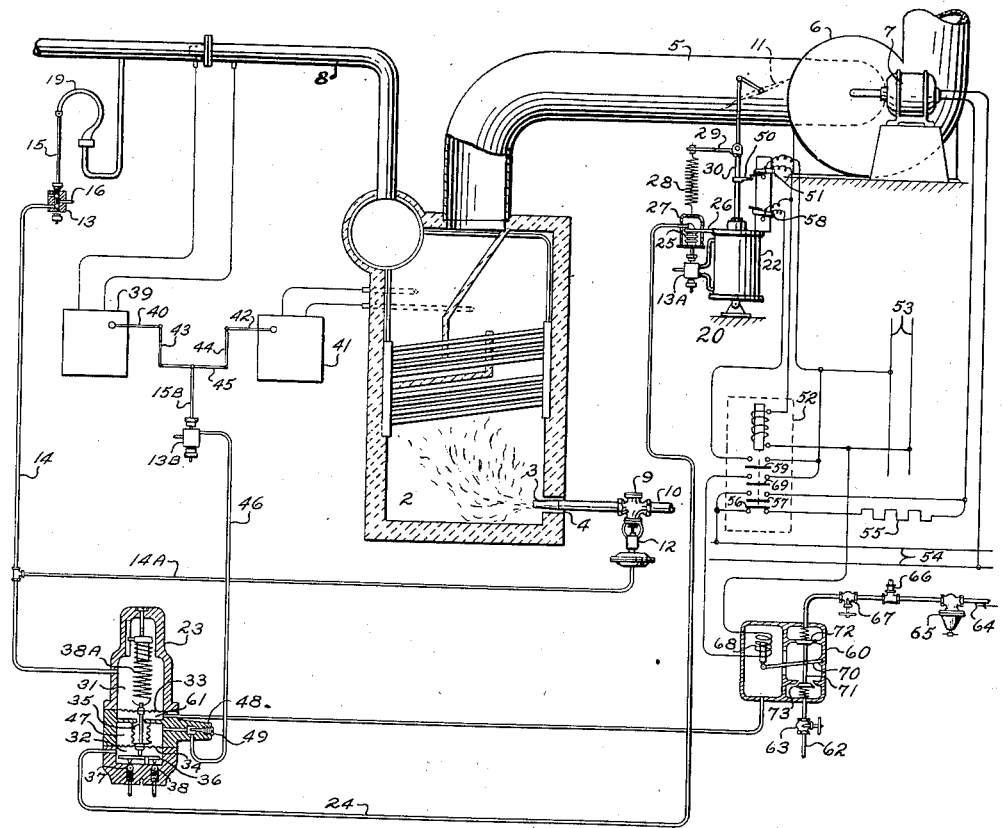
Fig. 1 is a diagrammatic illustration of my invention applied to the control of the air supply means of a vapor generator.

Referring to Fig. 1 I have therein shown my invention applied to the control of a vapor generator 1 having a combustion chamber 2 to which the elements of combustion comprising fuel and air are admitted through a burner 3 and a port 4 respectively. The gaseous products of combustion are withdrawn through an uptake or stack 5 by means of a fan 6 driven by a multi-speed motor 7. Generated vapor is passed through a conduit 8 to any desired point of usage (not shown). The rate of fuel supply may be regulated by means of a valve 9 positioned in a fuel supply pipe 10, and the rate of air supply may be regulated by means of a damper 11 adapted to be positioned in the uptake 5.

The regulating valve 9 is positioned by a diaphragm motor 12 sensitive to fluid pressures established by a pilot valve 13, transmitted through pipes 14 and 14A. The pilot valve 13 is preferably of the type forming the subject matter of an application to Clarence Johnson, Serial No. 673,212, filed in the United States Patent Office May 27, 1933, Patent No. 2,054,464, September 15, 1936, and is arranged to establish a loading pressure in the pipe 14 varying directly with the position of the valve stem 15. A cylindrical passageway extends longitudinally through the entire valve and through which a constant flow of pressure fluid from any suitable source (not shown) is maintained from a centrally located inlet port 16 to waste outlets at either end. The movable valve stem 15, centrally located in the passageway, has mounted thereon a pair of spaced suitably shaped valve members having a maximum diameter slightly less than that of the passageway; and each located substantially adjacent to a relatively narrow annular outlet port connected to the exterior of the valve by a suitable passageway. The pressure fluid in passing the valve members establishes a pressure gradient; and the pressure at the adjacent outlet port varies with the vertical position of the valve member. In the mid or neutral position of the valve stem 15 the pressure at both outlet ports is equal; upward movement of the valve stem producing proportionate increases in pressure at the upper outlet port, and proportionate decreases in pressure at the lower outlet port. Accordingly a loading pressure may be obtained varying directly with the variable to be controlled, or inversely thereto depending upon whether the loading pressure established at the upper or lower outlet port is used. The loading pressure so established may be utilized directly as, for example, in Fig. 1 where the loading pressure is transmitted directly from pilot 13 through pipe 14 to the diaphragm motor 12; or it may be utilized indirectly to control the operation of such devices, as hereinafter illustrated. With the arrangement shown in Fig. 1 I desire the loading pressure to vary inversely with vapor pressure, that is, for a given increase in vapor pressure to produce a proportionate decrease in loading pressure, connection is made to the lower outlet port. In practice a suitable plug or stopper may be inserted in the outlet port not in use, or as desired in some cases connection may be made to both the upper and lower outlet ports.

The valve stem 15 is pivotally connected to a Bourdon tube 19 sensitive to variations in pressure within the conduit 8. As the pressure of the vapor decreases for example, the valve stem 15 is positioned downwardly increasing the loading pressure established within the diaphragm motor 12, positioning the valve 9 in an opening direction. Conversely upon an increase in vapor pressure the valve 9, through the agency of the diaphragm motor 12, will be positioned in a closing direction an amount proportional to the increase in vapor pressure.

The rate at which air is supplied the combustion chamber 2 is preferably varied in accordance with variations in the rate of fuel supply. To this end I show the damper 11 positioned by a fluid pressure servomotor 20 which is sensitive to the variations in loading pressure produced by the pilot valve 13. The servomotor comprises a cylinder 22 having a piston therein (not shown) positioned by fluid pressure controlled by a pilot valve 13A similar to the pilot 13.

Variations in loading pressure established by the pilot 13 are transmitted through the pipe 14 to an averaging relay 23 hereinafter more fully described, wherein they produce proportionate variations in a control pressure transmitted through a pipe 24 to an expansible contractible bellows 25, secured by a bracket 26 to the cylinder 22. With the valve stem of the pilot valve 13A in the mid or neutral position fluid pressures established on either side of the piston are equal. Upon an increase in control pressure within the bellows 25 the valve stem is positioned downwardly, increasing the fluid pressure effective on the underside of the piston and decreasing the pressure on the upper side, thereby causing an upward movement of the piston effective for positioning the damper 11 in an opening direction. Conversely upon a decrease in control pressure within the bellows 25 the piston is moved downwardly, positioning the damper 11 in a closing direction.

So that movements of the piston will be proportional to the magnitude of the changes in control pressure, I show the lower head of the bellows 25 mounted in a stirrup 27 connected by a spring 28 to an arm 29 secured to a connecting rod 30 linking the piston with the damper 11. The force of the spring 28 acts in opposition to the force produced by the control pressure in the bellows 25, and when the pilot valve stem is in the neutral position the two forces are equal. When the control pressure increases, for example, the valve stem is positioned downwardly. The resulting movement of the connecting rod 30, through spring 28 then serves to restore the valve stem to its neutral position when the movement is in proportion to the increase in pressure. Conversely upon a decrease in control pressure the valve stem will move upwardly and thereafter the valve stem will be restored to the neutral position through the downward motion of the connecting rod 30 transmitted to the bellows 25 through the arm 29 and spring 28.

Loading pressures established by the pilot 13 and transmitted through the pipe 14 to a chamber 31 of the averaging relay 23 are balanced against the control pressures established in a chamber 32, through the agency of opposed diaphragms 33, 34 operatively connected by a movable member 35. Admission and discharge of pressure fluid from the chamber 32 is controlled by a spring loaded pivoted valve member 36 operating a fluid supply valve 37, connected to a suitable source of pressure fluid (not shown) and an exhaust valve 38. The arrangement is such that upon an increase in loading pressure within the chamber 31 the member 35 moves downwardly, opening the fluid pressure supply valve 37 until the pressure within the control chamber 32 is equal to or in desired proportion to that established in the chamber 31, when the member 35 is restored to the neutral position. The initial pressure at which the member 35 is in the neutral position may be varied as desired through the agency of an adjustable spring 38A. Pressures within the pipe 24 transmitted to the bellows 25 will accordingly bear a definite relation to the loading pressures established within the pipe 14, by the pilot 13, and accordingly the damper 11 will be positioned in direct proportion to changes in vapor pressure within the conduit 8.

As known, for optimum combustion efficiency fuel and air must be supplied in predetermined fixed ratio. To supply air in excess of that required creates a loss due to heating such excess to the temperature of the exhaust gases. Conversely to supply less air than that required results in incomplete combustion of the fuel. While the combustion control which I have so far described varies the fuel and air together, or in parallel, there is no assurance that the predetermined ratio resulting in optimum combustion efficiency will be maintained throughout the range of operation, due to divergence of damper characteristics as compared to valve characteristics, etc. Accordingly, notwithstanding that the rate of air flow may be correlated to the rate of fuel flow at some particular rate of flow of the latter, such ratio may not be maintained at other rates. To assure that air is continuously supplied in correct ratio to the rate of fuel supply I show in Fig. 1 means for modifying the rate of air supply to maintain the desired ratio. To this end I may make use of a relation gage described in Patent 1,257,965 to Bailey. Such a relation gage may be used to determine the ratio between the rate of flow of the gaseous products of combustion, which as known is an indication of the rate of air supply to the generator; and the rate of flow of vapor which as likewise known is a measure of the heat supplied by the fuel. I show in Fig. 1 a meter 39 of the rate of vapor flow through the conduit 8 provided with an indicator 40 adapted to move upwardly upon an increase in the rate of vapor outflow. A similar meter 41 provided with an indicator 42 measures the rate of flow of the gaseous products of combustion through the vapor generator 1. The indicator 42 is adapted to move downwardly as the rate of flow of products of combustion increases.

Depending from the indicators 40 and 42 are links 43 and 44 respectively, pivotally supporting a horizontal link 45. So long as the desired ratio is maintained between the rate of air flow and the rate of vapor flow the mid point of the horizontal link 45 remains stationary. When, however, the ratio of vapor flow to air flow decreases below that desired, the mid point of the horizontal link 45 will be positioned downwardly a proportionate amount, and when the ratio is greater than that desired the mid point will be elevated proportionately.

To produce a fluid pressure varying in accordance with deviations of the actual ratio between vapor flow and air flow from the desired ratio, I show the mid point of the horizontal link 45 pivotally connected to a valve stem 15B of a pilot valve 13B similar to the pilot valve 13. The pilot valve 13B serves to establish a loading pressure within an outlet pipe 46 proportional to the ratio between vapor outflow and air supply. As the ratio of fuel to air decreases the loading pressure within the pipe 46 will decrease, and as the ratio of fuel to air increases the loading pressure will increase.

The pipe 46 is shown connected to a chamber 47 of the averaging relay 23 through a throttling valve 48 having a movable or adjustable stem 49. Pressures within the chamber 47 serve to modify the effect of pressures within the chamber 31 so that control pressures established within the chamber 32 vary in accordance with the relationship between them. Thus upon an increase in loading pressure within the chamber 31 the rate of air supply and fuel supply will immediately be increased proportionately; and so long as the ratio of fuel to air remains at the desired ratio no further change in the rate of air supply will occur. However, if the increase in rate of air flow instigated by the increase in loading pressure within the chamber 31 is greater than that required to maintain the correct ratio between fuel and air, the pilot stem 15B will be displaced downwardly effecting a decrease in pressure within the chamber 47, thereby serving to decrease the control pressure within the chamber 32 effecting a positioning of the damper 11 in a direction to decrease the rate of air flow.

The throttling valve 48 serves to delay the effectiveness of a change in loading pressure produced by a variation in vapor flow—air flow ratio until a change in fuel flow has been reflected in a change in vapor flow. Obviously, while a change in position of the damper 11 will immediately affect the rate of air supply, a change in fuel flow will not instantly effect a change in the rate of vapor outflow, due to the heat capacity of the vapor generator 1, time required for combustion, etc. Accordingly if the throttling valve 48 was eliminated, a change in position of both valve 9 and damper 11 dictated by a change in vapor pressure would immediately act to produce the required change in rate of air supply which, through the indicator 44 and pilot valve 13B would effect a counteracting positioning of the damper 11 and nullify the change produced by the change in vapor pressure. As the valve 9 had originally been positioned in parallel with the damper 11, a deficiency or greater excess of air than required would result. The throttling valve 48 therefore serves to delay the action of the ratio sensitive pilot 13B until the effect of a change in fuel supply has been reflected in a change in vapor outflow.

In general therefore the control system shown in Fig. 1 acts to immediately vary both fuel and air in parallel upon a change in vapor pressure and thereafter to readjust the rate of air flow to maintain a desired ratio between rate of vapor outflow and rate of air flow. It is, of course, apparent that certain modifications may be made in the method of control while still employing the same basic principles. Thus, for example, if the combustion chamber 2 is provided with solid fuel on a grate, or in other form, it might then be advisable to vary the rate of air supply in accordance with variations in vapor pressure and readjust the rate of fuel supply in accordance with the ratio between vapor outflow and air supply. The methods of control which I have described, however, are in general well known in the art and comprise no part of my present invention.

When the damper 11 is positioned to a substantially wide open position, indicating that the maximum rate of air supply has been reached for the then existing speed of the fan 6, an arm 50 mounted on the connecting rod 30 is arranged to close a normally open mercury switch 51 effecting energization of a solenoid relay 52. So long as the relay 52 is deenergized the motor 7 is connected to a source 54 through a resistance 55 and a finger 56 of the relay 52. Energization of the relay 52 acts to cut out the resistance 55 and connect the motor 7 directly to the source 54 through a finger 57, thereby increasing its speed.

To prevent the motor 7 from reverting to the original speed as soon as the damper 11 is positioned to a partially closed position, energization of the solenoid 52 by closure of the mercury switch 51 is arranged to immediately provide permanent energization through a normally closed mercury switch 58 and finger 59. Notwithstanding then that the damper 11 may be moved to a partially closed position, opening switch 51, the solenoid 52 will remain energized, thereby maintaining the motor 7 at high speed. When the damper 11 is positioned to a nearly closed position the arm 50 is arranged to open the switch 58, thereby deenergizing the solenoid 52 and reducing the speed of the motor 7 by again introducing the resistance 55 into the circuit.

Operation of the switches 51 and 58 produce an immediate and abnormal change in the rate at which air is supplied to the combustion chamber 2. If the correct ratio is to be maintained with respect to the rate of fuel flow, upon a change in speed of the fan 6, damper 11 should immediately be positioned in a direction producing a change in the rate of air supply in opposite sense to that caused by the change in fan speed. The desired operation being, for example, that upon an increase in the rate of vapor outflow through the conduit 8 the damper 11 will be positioned in an opening direction until substantially wide open when the switch 51 will close, increasing the speed of the fan 6. During the period of transition when the fan 6 is increasing in speed, the damper 11 should be positioned proportionately in a closing direction so that the rate of flow of the products of combustion through the uptake 5 and accordingly the rate of air supply to the combustion chamber 2 will remain substantially constant. The control system which I have thus far described will function to eventually counteract the change in fan speed through the agency of the ratio sensitive pilot 13B, which operates to maintain the desired ratio between the rate of vapor outflow and rate of air supply. However, due to the delayed action produced by the throttling valve 48, for a period of time following the change, the rate of air supply will be far in excess, or greatly less, than that required to effect proper combustion with the then existing rate of fuel supply. Sudden changes in the rate of air supply may also be of sufficient magnitude to snuff out the flame within the combustion chamber 2, thereby creating a dangerous and hazardous condition.

I provide for positioning the damper 11 in consonance with changes in speed of the fan 6 whereby the rate of flow of the products of combustion through the uptake 5 remains substantially constant during the period of transition from one fan speed to another. I accomplish this through a normally deenergized three-way solenoid valve 60 adapted to control the admission and discharge of pressure fluid to a chamber 61 of the averaging relay 23. The valve 60 may be opened to the atmosphere through an outlet 62 in which is positioned a throttling valve 63; or it may be supplied with fluid pressure from a suitable source (not shown) through an inlet 64 in which is connected a pressure regulator 65, a bleed orifice 66 and a throttling valve 67. Through the agency of the pressure regulator 65 and bleed orifice 66 the pressure available at the valve 60 may be established at any desired value. The throttling valves 63 and 67 provide means for adjusting the rate of flow of pressure fluid to and from the valve 60.

The valve 60 is provided with a solenoid 68 connected to the source 53 through a normally open finger 69 of the relay 52. The solenoid, through a pivoted arm 70, operates a valve stem 71, on which are mounted opposed valve members 72 and 73. When the solenoid 68 is deenergized the chamber 61 is in communication with the atmosphere as the valve member 73 is open, whereas the valve member 72 is closed. Upon energization of the solenoid 68 the valve stem 71 moves upwardly,—closing the valve member 73 and opening the valve member 72, thereby admitting fluid pressure from the inlet 64 to the chamber 61.

With the fan 7 at low speed the solenoid 68 is deenergized and the damper 11 is positioned in accordance with variations in loading pressures established within the chambers 31 and 47. When, however, a substantially wide open position is obtained the switch 51 is closed, as hereinbefore described, energizing the solenoid 52 and increasing the speed of the motor 7. Simultaneously the finger 69 is closed, thereby energizing the solenoid 68 and introducing pressure fluid, of a magnitude determined by the adjustment of the pressure regulator 65, into the chamber 61. The increase in pressure within the chamber 61 acts in opposition to that established within the chambers 31 and 47 and serves to effect a predetermined constant change in pressure within the control chamber 32. The increase in pressure within the chamber 61, upon the increase in speed of the motor 7, serves to decrease the pressure within the control chamber 32 positioning the damper 11 in a closing direction. Conversely upon the speed of the motor 7 being decreased, due to opening of the switch 58, the pressure now established in the chamber 61 is discharged to atmosphere through the opening of the valve member 73 and closure of the opposed valve member 72, effecting a proportionate increase in pressure within the control chamber 32 serving to position the damper 11 in an opening direction.

Changes in speed of the fan 7 serve to effect predetermined definite changes in rate of flow of the products of combustion through the uptake 5. By proper adjustment of the pressure regulator 65 changes in pressure within the chamber 61 may be made sufficient so that the positioning of the damper 11 compensates for the change in rate of flow of products of combustion due to the change in fan speed, to the end that the rate of flow after the change is substantially the same as that existing prior to the change.

As known, the rate of fan speed does not increase or decrease instantaneously, but there exists a certain period of transition during which the fan speed is changing. If the full value of pressure established by the regulator 65 was admitted to the chamber 61 at the beginning of this period of transition the damper 11 would effect a more rapid decrease in the rate of flow of the products of combustion than the increase effected by the increasing speed of the fan 6. Accordingly during the period of transition from low to high fan speeds a deficiency of air would exist. To prevent the establishment of such a condition the throttling valve 67 may be adjusted so that the positioning of the damper 11 will effect a slower rate of change in the rate of flow of the products of combustion than that caused by the change in fan speed. Likewise the throttling valve 63 may be adjusted so that upon a decrease in fan speed the damper 11 will not immediately be positioned to an open direction but will preferably lead the decreasing fan speed a predetermined amount so that throughout the entire periods of transition the rate of flow of the products of combustion and accordingly the rate of air admission to the combustion chamber 2 will remain substantially constant, or increase but slightly above that desired.

As the pressure within the pipe 24 bears a fixed relation to the position of the damper 11 it is apparent that it may be used if desired as an indication of damper position. Accordingly in Fig. 7 I have shown an arrangement whereby the solenoid 52 may be actuated by switches 74 and 75 sensitive to pressure variations within the pipe 24. The switch 74 is arranged so that upon some predetermined pressure within the pipe 24 being established, corresponding to a substantially open position of the damper 11, it is closed, whereas the switch 75 is arranged to open upon the pressure within the pipe 24 reaching a predetermined minimum corresponding to a nearly closed position of the damper 11.

In Fig. 2 I have shown my invention arranged to provide for a plurality of successive speed changes of the motor 7 in either sense. Simultaneously with such speed changes the arrangement is such that fluid pressures of predetermined values are admitted into the chamber 61 of the averaging relay 23 whereby the damper 11 is positioned in proper sense and amount to maintain the rate of flow of products of combustion through the duct 5 substantially constant throughout such speed changes. Connected to the pipe 24 I show pressure switches 76, 77, 78 and 79. As the pressure within the pipe 24 increases from a minimum value corresponding to a closed position of the damper 11, to a maximum value corresponding to an open position; the switches 76, 77, 78 and 79 are operated in proper sequence at certain predetermined pressures; bringing the motor 7 to consecutively higher speeds and simultaneously repositioning the damper 11 a consonantal amount in a closing direction. Conversely as the pressure within the pipe 24 decreases from a maximum to a minimum value, the pressure switches 76, 77, 78 and 79 are operated in inverse order bringing the motor 7 to consecutively lower speeds and simultaneously repositioning the damper 11 a consonantal amount in an opening direction.

With an increasing pressure within the pipe 24 the motor 7 will change from a lower to a higher speed at a greater pressure than that at which the reverse change will occur. This overlap is provided to prevent repetitious changes in the speed of the motor 7 when the pressure within the pipe 24 moves above and below a pressure value effecting actuation of one of the switches.

In Fig. 2 as shown, the motor 7 is at a relatively low speed as substantially all of the resistance 55 is effective and the damper 11 in a near closed position. As the pressure within the pipe 24 increases, due to a decrease in vapor pressure, for example, the damper 11 will be positioned in an opening direction. At some predetermined pressure value within the pipe 24 corresponding, for example, to a 20% max. opening of the damper 11, the pressure switch 79 will operate to close associated finger 87. The motor 7 will remain at the same fixed speed however, as the finger 87 acts only to sustain the speed of the motor 7 at the next higher step after actuation of the pressure switch 76 arranged to operate, for example, when the pressure within the pipe 24 indicates that the damper 11 is at 40% max. opening.

Closure of the finger 81 of the switch 76 will effect energization of a solenoid relay 82, closing fingers 83 and 84. A solenoid 68A of a three-way valve 60A similar to the valve 60 will be energized through closure of finger 84 and introduce into a chamber 31A of an averaging relay 23A, similar to the relay 23, a pressure of a magnitude determined by the adjustment of a regulating valve 65A. A proportionate pressure increase will occur in control chamber 32A and be transmitted through one branch of a pipe 85 to the chamber 61 of the averaging relay 23 and serve to effect a positioning of the damper 11 in a closing direction. Simultaneously therewith the pressure increase in chamber 32A will be transmitted through the other branch of the pipe 85 to a regulator 20A, similar to the regulator 20, and adapted to position a contact arm 86 to decrease the amount of resistance 55 connected in circuit with the motor 7. By proper adjustment of the regulating valve 65A the decrease in flow effected by positioning of the damper 11 may be made substantially equal to the increase in flow effected by the speed increase of the motor 7.

Positioning of the damper 11 to a less than 40% opening through a decrease in pressure within the pipe 24 will open the switch 76. However, the solenoid 82, and accordingly the solenoid 68A, will remain energized through the finger 83 connected to the source 53 through the finger 87 of the pressure switch 79. When, however, the pressure within the pipe 24 decreases a further predetermined amount due, for example, to a further increase in vapor pressure, until the damper 11 is positioned to a 20% opening, the pressure switch 79 opens the finger 87 thereby deenergizing the solenoids 82 and 68A, reducing the pressure within chamber 31A to that of the atmosphere and producing a corresponding decrease in pressure within the chamber 61, opening the damper 11 a predetermined amount. Simultaneously the regulator 20A will operate to increase the amount of resistance 55 effective in the circuit of the motor 7.

If, however, in place of the pressure within the pipe 24 decreasing after actuation of the pressure switch 76 it had continued to increase due, for example, to further decreases in vapor pressure, then at some predetermined pressure value within the pipe 24, for example that corresponding to a 60% max. opening of the damper 11, pressure switch 77 would operate to close associated fingers 88 and 89. Closure of the finger 89 energizes solenoid 90 having a normally closed finger 91 and normally open fingers 92 and 93. Opening of the finger 91 serves to deenergize the solenoid 82 opening finger 84 and deenergizing solenoid 68A, introducing atmospheric pressure into the chamber 31A. Simultaneously therewith closure of the finger 93 serves to energize the solenoid 68B of a three way valve 60B similar to the three way valve 60, thereby introducing into chamber 47A of the relay 23A a pressure predetermined by a regulating valve 65B, so adjusted as to produce a higher pressure than that produced by the regulating valve 65A. Closure of the finger 92 sustains energization of the solenoid 90 notwithstanding that the pressure within the pipe 24 may fall below that necessary to operate the pressure switch 77.

An increase in pressure within the pipe 24 sufficient to operate the switch 77 therefore serves to release the pressure within the chamber 31A and simultaneously introduce into the chamber 47A a pressure of higher magnitude. The net increase in pressure within the chamber 32A caused thereby is effective for further operating the regulator 20A to produce a further predetermined decrease in the resistance 55 effective in the circuit of the motor 7; and simultaneously and in consonance therewith to effect a predetermined positioning of the damper 11 in a closing direction. The ensuing decrease in pressure within the pipe 24 to effect the positioning of the damper 11 will not effect deenergization of the solenoid 90 notwithstanding that the pressure switch 77 will operate to open fingers 88 and 89, as the solenoid 90 will continue to be energized from the source through the finger 92. If further decreases of pressure within the pipe 24 should occur, the solenoid 90 will be deenergized upon operation of the pressure switch 76 opening the fingers 80 and 81, for as shown the finger 92 is connected to the source through the finger 80.

Such operation of the pressure switch 76, while serving to deenergize the solenoid 90 will also serve to energize the solenoid 82, therefore while releasing the pressure within the chamber 47A to atmosphere, will introduce into chamber 31A the pressure established by the regulating valve 65A. I accomplish this by arranging the finger 80 to open slightly before the finger 81 thus permitting the solenoid 90 to be deenergized, closing the finger 91 and momentarily energizing the solenoid 82 through the finger 81. Thereafter the solenoid 82 will remain energized, notwithstanding opening of the finger 81, until the pressure switch 79 opens the finger 87.

If the pressure within the pipe 24 should increase, say to that corresponding to an 80% opening of the damper 11, the pressure switch 78 operates to close associated finger 94 energizing a relay 95 having normally open fingers 96 and 97. Closure of the finger 96 serves to maintain the solenoid 95 energized notwithstanding a decrease in pressure within the pipe 24 below that operating the pressure switch 78 to open the finger 94. Closure of the finger 97 serves to energize the solenoid 82 and through resulting closure of associated finger 84; solenoid 68A of the three-way valve 60A. Accordingly the pressure established by the pressure regulator 65A is again introduced into the chamber 31A of the averaging relay 23A and the pressure in the control chamber 32A will be proportional to the sum of the pressures within the chambers 31A and 47A. This increase in pressure will be transmitted to the averaging relay 23 and produce a positioning of the damper 11 in a closing direction simultaneously with the operation of the regulator 20A to effect a further decrease in the resistance 55 effective in the circuit of the motor 7.

A decrease in pressure within the pipe 24 below that necessary to maintain closure of the finger 94 will not deenergize the solenoid 95. When however the pressure within the pipe 24 has decreased sufficiently to operate pressure switch 77 and open finger 88, the solenoid 95 will be deenergized and through finger 97 produce deenergization of solenoid 82 and accordingly of the solenoid 68A. Thereafter the solenoid 90 will remain energized until the pressure switch 76 operates to open the fingers 80 and 81, when the solenoid 82 will be energized. Deenergization of the solenoid 90 will produce deenergization of the solenoid 68B of the three-way valve 60B and energization of the solenoid 82 will energize the solenoid 68A of the three-way valve 60A. When the pressure switch 79 operates to open the finger 87 the solenoid 68A will become deenergized and the speed of the motor 7 will be at a minimum.

In Fig. 3 I show a modified form of my invention adapted to a system wherein the rate of flow of the products of combustion through the uptake 5 is regulated solely by varying the speed of the fan 6 which may be arranged to be driven from an output shaft 98 of a hydraulic coupling 99 driven by the variable speed motor 7. As known, the output shaft speed of a hydraulic coupling may be varied as desired by altering the quantity of hydraulic fluid within the coupling. Thus increases in the volume of hydraulic fluid within the coupling effect proportionate increases in the output shaft speed and when the internal passages are completely filled the output shaft speed will be slightly less than the input shaft speed. Conversely decreases in the volume of hydraulic fluid effect proportionate reductions in output shaft speed and when the coupling is empty of fluid the output shaft speed will usually be in the nature of 20% of the input shaft speed, the exact percentum depending upon coupling design.

To further increase the range in fan speed available, the coupling may be driven as shown by the variable speed motor 7. To prevent sudden increases or decreases in fan speed when a change is made in motor speed it is desirable to vary the quantity of the hydraulic fluid in the coupling to counteract changes in fan speed caused by changes in motor speed. Such changes in the quantity of hydraulic fluid within the coupling are preferably accomplished in synchronism with the acceleration or deceleration of the motor so that during the period of transition the fan speed remains substantially constant.

To provide for varying the quantity of oil within the hydraulic coupling 99 in accordance with vapor pressure changes and deviations in the ratio between rate of vapor outflow and rate of air flow, I may employ apparatus forming a part of the subject matter of my prior application, Serial No. 27,425 filed in the United States Patent Office June 19, 1935. In accordance therewith a substantially constant circulation of hydraulic fluid is maintained through a circuit comprising a constantly operating pump 100, by-pass line 101, and a pump suction pipe 102, the lower end of which is submerged in hydraulic fluid contained within a reservoir 103. A constant circulation of hydraulic fluid is also maintained through a circuit comprising the pump 100, a diaphragm valve 104, pipe 105, oppositely acting diaphragm valve 106 and suction pipe 102. So long as the speed of the fan 6 is at the desired value, the flow through the diaphragm valve 104 to the pipe 105 is equal to the flow therefrom through the diaphragm valve 106. When, however, it is desired to increase the speed of the fan 6, for example, the diaphragm valve 104 is positioned in an opening direction whereas the diaphragm valve 106 is simultaneously positioned in a closing direction, thereby increasing the flow of hydraulic fluid to the pipe 105 above the discharge therefrom. The difference is transmitted to the hydraulic coupling 99 through a pipe 107 to a coupling inlet tube 108. Such increase in quantity of oil within the coupling 99 is effective for increasing the speed of the output shaft 98 and accordingly the speed of the fan 6. Conversely when it is desired to decrease the speed of the fan 6 the diaphragm valve 104 is positioned in a closing direction whereas the valve 106 is positioned in an opening direction, thereby increasing the flow of oil from the pipe 105 above that admitted thereto, withdrawing oil from the hydraulic coupling 99. The reservoir 103 serves to hold in storage excess hydraulic fluid over that required. The hydraulic fluid within the coupling 99 may be maintained at a desired temperature by providing a constant circulation from a suitable outlet 109 and a heat exchanger 110 to the inlet 108. The diaphragm valves 104 and 106 are actuated by variations in a fluid pressure produced in the control chamber 32 of the averaging relay 23, and transmitted through a pipe 111.

In order that the valves 104 and 106 will be properly positioned to change the speed of the output shaft 98 when desired, and repositioned to the neutral position when the desired change has been consummated, I introduce into the chamber 61 a pressure proportional to the speed of the output shaft 98. Accordingly changes in pressure within the chambers 31 and 47 of given magnitudes will produce proportionate changes in the speed of the output shaft 98. In producing a pressure proportional to the speed of the output shaft 98 I use a mechanism of a type forming the subject matter of an application of Paul S. Dickey, Serial No. 8,023, filed in the United States Patent Office February 25, 1935, Patent No. 2,098,913, November 9, 1937. In accordance therewith I show a fluid compressor 115 driven by the output shaft 98 through suitable belt means 116. Located in the discharge pipe 112, which is connected to the chamber 61, is a reservoir 113 provided with an orifice 114, of such size that the pressure of the atmosphere is always below the critical value of any pressure existing within the pipe 112. It follows from Napier's Law that the pressure within the pipe 112 will therefore be proportional to the actual speed of the output shaft 98.

When the speed of the output shaft 98 is at a maximum for the then existing speed of the motor 7 I utilize the means disclosed in Fig. 1 to increase the speed, and utilize the pressure established by the compressor 115 to simultaneously withdraw hydraulic fluid from the coupling to maintain the output shaft speed substantially constant throughout the period of time during which the speed of the motor 7 is increasing. Conversely with the motor at high speed and the speed of the output shaft 98 at a minimum, the control systems act to decrease the speed of the motor 7 and simultaneously introduce hydraulic fluid into the coupling 99.

As a definite relation exists between the quantity of hydraulic fluid within the coupling 99 and speed of the output shaft 98, I may utilize the latter as an indication of the quantity of hydraulic fluid within the coupling 99; and when it indicates that the coupling 99 is either substantially full or empty of hydraulic fluid vary the speed of the motor 7 accordingly.

Connected to the pipe 112 I show a pressure sensitive bellows 117 actuating a pivotally supported beam 118. When the pressure within the pipe 112 indicates that the hydraulic coupling 99 is substantially full of hydraulic fluid the beam 118 closes the switch 51, energizing the relay 52, increasing the speed of the motor 7. Conversely when the pressure within the pipe 112 indicates that the hydraulic coupling 99 is substantially empty of hydraulic fluid the bellows 117 moves the beam 118 to open the switch 58, thereby de-energizing the relay 52 and decreasing the speed of the motor 7.

As the speed of the output shaft 98 starts to change as a result of such changes in speed of the motor 7, the fluid pressure within the chamber 61 will also change, operating the valves 104 and 106 to vary the quantity of hydraulic fluid within the coupling 99. Such variations in hydraulic fluid will act to vary the speed of the output shaft 98 in opposite direction to the variations caused by changes in speed of the motor 7, the net result being that the output shaft speed remains at the magnitude dictated by the pressures within the chambers 31 and 41.

Figure 4:
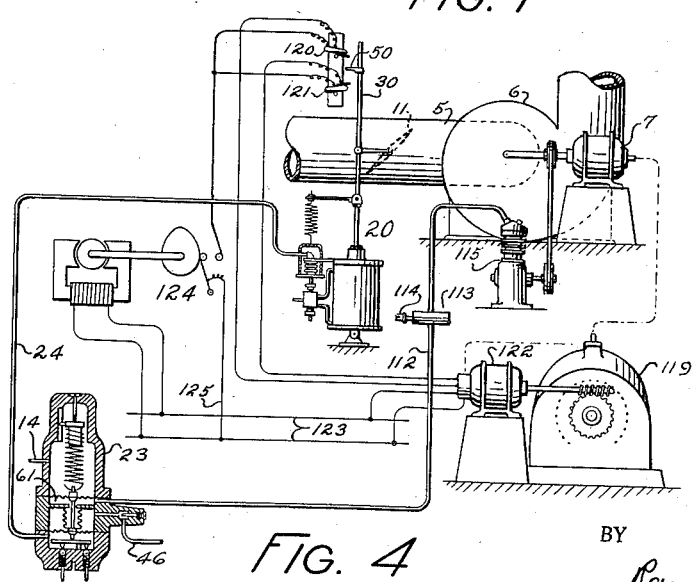
Fig. 4 illustrates another embodiment of my invention applied to a modified form of air supply means.

In Fig. 4 I show a modified form of my invention wherein I utilize the speed responsive device comprising the fluid compressor 115, chamber 113 and orifice 114 to establish a fluid pressure proportional to the speed of the motor 7. This fluid pressure I then utilize to reposition the damper 11 upon a change in speed of the motor 7 to maintain the flow of products of combustion through the uptake 5 and accordingly the rate at which air is supplied the vapor generator 1 substantially constant throughout such speed changes.

The speed of the motor 7 is controlled by a drum controller 119 provided with a desired number of resistances, circuit modifying devices, etc. (not shown) whereby the speed of the motor 7 may be progressively varied through any desired number of steps.

The arm 50 of the servomotor 20 is adapted to close a mercury switch 120 when the damper 11 is in a nearly open position and to similarly close a mercury switch 121 when the damper 11 is in a nearly closed position. Closure of the switch 120 energizes a reversible pilot motor 122 from a suitable source 123 in a direction to increase the speed of the motor 7. Conversely closure of the switch 121 effects energization of the motor 122 in a direction to decrease the speed of the motor 7. The pilot motor 122 may be provided with suitable running switches as known so that upon momentary energization through either the switch 120 or 121, operation will continue until the drum controller has been advanced one step, whereupon further operation will cease until there is a further momentary closure of either switch 120 or 121. In order that closure of either switch 120 or 121 will provide but momentary energization of the pilot motor 122 notwithstanding the fact that the damper 11 may remain for a short period of time in a nearly open or closed position, a continuously running interrupting switch 124 is inserted in a conductor 125, connecting switches 120 and 121 to the source 123. The operation of the interrupting switch 124 may be adjusted so that between periodic closures, time is provided for speed changes of the motor 7 instigated by closure of the switch 120 or 121 to be consummated before a further change is instigated.

The pipe 112 is connected to the chamber 61 of the averaging relay 23. Upon a change in speed of the motor 7 the pressure within the pipe 112 is varied proportionately, thereby effecting through the agency of the averaging relay 23 a corresponding repositioning of the damper 11, whereby the rate of flow of products of combustion, and accordingly the rate at which air is supplied the vapor generator 1, remains constant or is varied solely in accordance with variations in fluid pressure established within the pipes 14 and 46. As the fluid pressures within the pipe 112 vary in direct proportion to changes in speed of the motor 7 the damper 11 will be positioned exactly proportional to changes in rate of flow of the products of combustion regardless of the acceleration characteristics of the motor 7.

As the pressure within the pipe 24 is an indication of the position of the damper 11, I may in place of utilizing switches 120 and 121; as shown in Fig. 8 utilize switches 120A and 121A actuated by pressure responsive bellows 126 and 127, respectively, connected to the pipe 24. With this arrangement when the pressure within the pipe 24 indicates that the damper 11 is in a nearly wide open position the switch 120A will close. Similarly when the pressure within the pipe 24 indicates that the damper 11 is in a nearly closed position the switch 121A will close.

Figure 5:
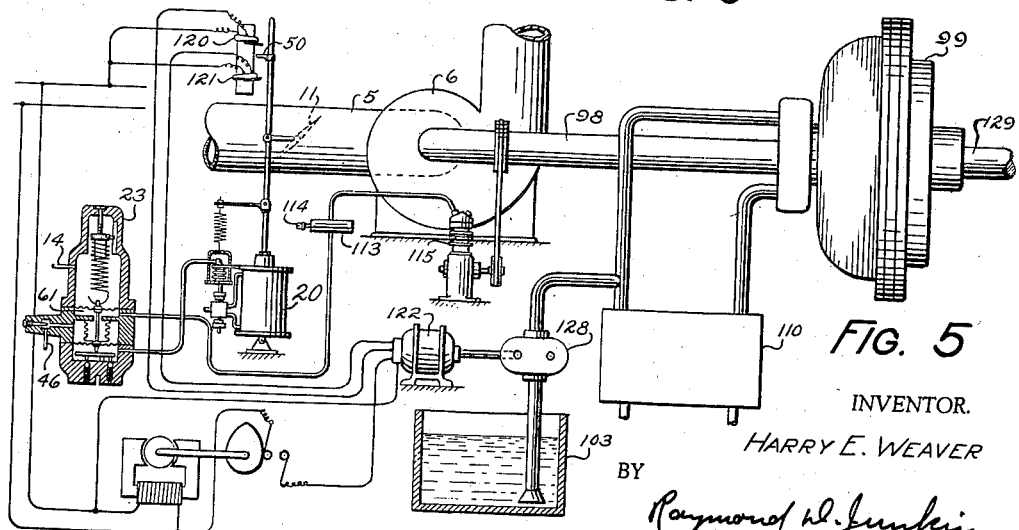
Fig. 5 is a modification of my invention as illustrated in Fig. 4 applied to an alternate form of air supply means.

In Fig. 5 I show a further modified form of my invention wherein basic changes in the rate of flow of the products of combustion through the uptake 5 are produced by varying the quantity of hydraulic fluid in the hydraulic coupling 99 a predetermined amount, and intermediate changes in the rate of flow of the products of combustion are produced by proper positioning of the damper 11 in accordance with the variations in fluid pressure established within the pipes 14 and/or 46. Therein the reversible pilot motor 122 is shown operatively connected to a fluid pump 128 arranged upon rotation in one direction to transfer oil from the reservoir 103 to the coupling 99 and upon operation in reverse direction to withdraw hydraulic fluid from the coupling 99 to the reservoir 103. Upon the damper 11 reaching a nearly open position the switch 120 is closed, thereby initiating operation of the motor 122 in a direction to increase the hydraulic fluid within the coupling 99. Operation of the motor 122 may be arranged to continue for any predetermined increment of time through the provision of suitable running switches (not shown). Similarly upon the damper 11 reaching a nearly closed position the switch 121 will close, initiating operation of the motor 122 to withdraw hydraulic fluid from the coupling 99. As after initial energization through the agency of switches 120 and 121 the motor 122 will continue to operate for a predetermined increment of time it follows that a predetermined amount of hydraulic fluid will be admitted to or withdrawn from the hydraulic coupling 99, thereby increasing or decreasing the speed of the output shaft 98 a predetermined amount.

Upon a change in speed of the output shaft 98 the damper 11 is positioned a proportionate amount to maintain the rate of flow of the products of combustion through the uptake substantially constant by the establishment in the chamber 61 of the averaging relay 23 a fluid pressure proportional to the speed of the output shaft 98 through the agency of the fluid compressor 115, chamber 113, and bleed orifice 114. The hydraulic coupling 99 may be driven through an input shaft 129 from any suitable constant speed source of power (not shown).

Figure 6:
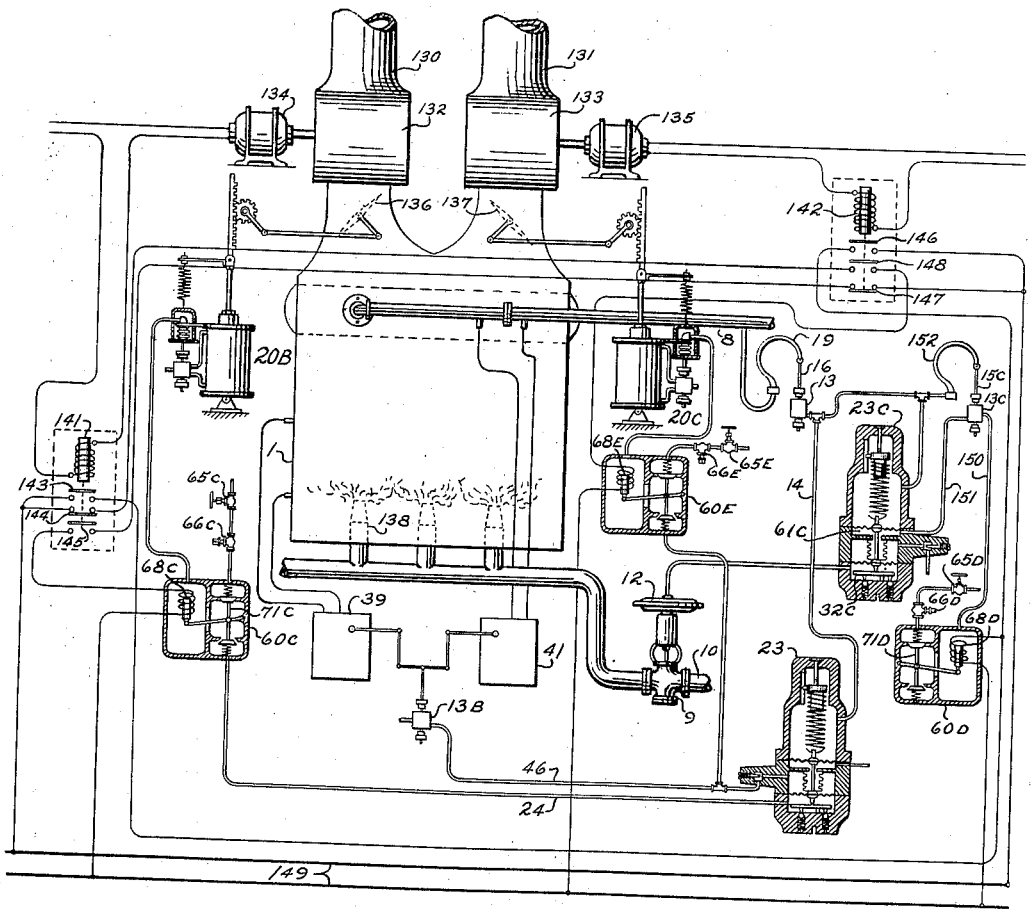
Fig. 6 illustrates a further embodiment of my invention.

In Fig. 6 I show my invention arranged to act as an interlock between the fuel and air supply means of a vapor generator; and between the various air supply and regulating means so that, for example, upon failure of the air supply means proportionate changes are made in the rate of fuel supply and air regulating means to the end that furnace combustion conditions remain normal and the establishment of dangerous and hazardous conditions is an impossibility. I show the vapor generator 1 in plan view provided with uptakes 130 and 131 in which are interposed fans 132 and 133 driven by motors 134 and 135 respectively. The rate of flow of the products of combustion from the vapor generator 1 is controlled by dampers 136 and 137 operated by fluid pressure servomotors 20B and 20C respectively. Fuel is supplied the vapor generator 1 through a plurality of burners 138 and the rate of fuel flow is regulated by the valve 9 operated by the diaphragm motor 12.

Normally the fluid pressure servomotors 20B and 20C are controlled in parallel in accordance with variations in vapor pressure within the conduit 8 modified in accordance with variations in the ratio between the rate of vapor outflow and the rate of air supply. The diaphragm motor 12 is likewise controlled by variations in vapor pressure through the agency of the fluid pressure established within a control chamber 32C of an averaging relay 23C similar to the relay 23.

In the event of failure of the fan 132 or 133 and/or motor 134 or 135 my invention contemplates producing an immediate proportional change in the rate of fuel supply so that the ratio between the rate of fuel supply and air supply remains at the desired value; and also positioning of the associated damper 136 or 137 to a closed position to prevent the possible inflow of gases through the uptake.

To provide for proper modification of fuel flow in the event of fan or motor failure I show solenoid switches 141 and 142 connected in the electrical circuit of the motors 134 and 135 respectively. Normally the solenoids 141 and 142 are energized. Upon failure of the associated fan, deenergization occurs due to the opening of the usual circuit breakers, thermal cutouts, or other protective means (not shown) connected in the electrical circuits of the motors 134 and 135.

The relay 141 is provided with fingers 143, 144 and 145. Upon failure of the motor 134 the solenoid 141 is deenergized and the fingers 143, 144 and 145 move downwardly. Similarly the solenoid relay 142 is provided with fingers 146, 147 and 148 which upon failure of the motor 135 move downwardly. Deenergization of the relay 141 connects a solenoid 68C of a three-way valve 60C to a suitable source 149 through fingers 145 and 147. Energization of the solenoid 68C moves the valve stem 71C upwardly, shutting off the transmittal of pressure from the pipe 24 to the servomotor 20B and admitting fluid pressures established by a valve 65C and orifice 66C. The valve 65C may be so adjusted that the fluid pressure thereby produced is sufficient to position the damper 136 to a closed position. In some cases the pressure of the atmosphere admitted through the valve 65C will be sufficient to position the damper 136 to a closed position.

Simultaneously with such positioning of the damper 136 a solenoid 68D of a three-way valve 60D will be energized from the source 149 through finger 143. Normally atmospheric pressure is transmitted through the three-way valve 60D to a pipe 150. Energization of the solenoid 68D, however, moves the valve stem 71D upwardly, closing the port to atmosphere and admitting to the pipe 150 a fluid pressure established by the valve 65D and orifice 66D. The pipe 150 is connected to the inlet port of a pilot valve 13C, the outlet port of which is connected to a chamber 61C of the averaging relay 23C by a pipe 151. Pressures within the chamber 61C serve to modify the pressure established within the control chamber 32C and transmitted to the diaphragm motor 12. Energization of the solenoid 68D will therefore serve to introduce into the chamber 61C a fluid pressure which acts to decrease the pressure in chamber 32C, which decrease in turn serves to position the valve 9 in a closing direction decreasing the rate of fuel supply.

The valve stem 15C of the pilot 13C is pivotally connected to a Bourdon tube 152 sensitive to pressures established by the pilot 13 in accordance with variations in vapor pressure. Fluid pressures transmitted from the three-way valve 60D to the chamber 61C will be continuously modified in accordance with variations in vapor pressure; the arrangement in general serving to continuously reduce the fuel supply in proportion to the decrease in air supply caused by the failure of the fan and/or motor. Thus assuming that one half the products of combustion pass through the uptake 130, and one half through uptake 131, failure of a fan and/or motor will cut the air supply in half necessitating a corresponding reduction in fuel supply. Thereafter to maintain the correct ratio between fuel and air supply, changes in loading pressure established by the pilot 13 should produce one half the change in fuel supply as they did previously, as the said changes now effect but half the change in air supply as they did previously. The pilot valve 13C sensitive to changes in loading pressure established by the pilot 13 serves to effect this end by continuously modifying the pressures transmitted to the chamber 61C to the end that, notwithstanding failure of a fan and/or motor, simultaneous fuel and air changes caused by variations in vapor pressure are in substantially correct proportion to each other necessitating a minimum of readjustment of the air supply through the agency of the ratio sensitive pilot 13B.

Failure of the fan 133 and/or motor 135 serves to deenergize the relay 142, thereby energizing a relay 68E of a three-way valve 60E through finger 148 of solenoid relay 142 and finger 144 of relay 141. Energization of the solenoid 68E serves to disconnect pipe 46 from the servomotor 20C and connect it to a source of fluid pressure established by a valve 65E and orifice 66E. The fluid pressure so established is arranged to actuate the servomotor 20C to position the damper 137 to a closed position. Simultaneously the solenoid 68D is energized thereby modifying the rate of fuel supplied to the vapor generator as hereinbefore described.

By providing that the solenoid 68C is energized through finger 145 of relay 141, and finger 147 of relay 142, failure of the fan 133 and/or motor 135 after failure of the fan 132 and/or motor 134 serves to deenergize the solenoid. Similarly the solenoid 68E is deenergized through failure of the fan 132 and/or motor 134 after failure of the fan 133 and/or motor 135. Accordingly upon failure of both air supply means the dampers 136 and 137 will remain under the control of the fluid pressure established in the pipe 24 thereby preventing the complete stoppage of air flow through the vapor generator 1.

While in the foregoing description I have described certain forms of my invention, it is apparent that it may be embodied in further forms and modifications; that it is not limited to the control solely of vapor generators but may be applied to any apparatus wherein an agent or agents contributing to the production or maintenance of a condition are supplied through supply means having a plurality of rates of operation; and that I am not to be limited except as to the claims in view of prior art.

What I claim as new, and desire to secure by Letters Patent of the United States, is:

1. A fluid pressure control system comprising in combination, means sensitive to the magnitude of a controlled condition for producing a first fluid pressure, a regulator for an agent affecting the condition, a servo-motor for positioning said regulator having a predetermined range of operation normally under the control of the first fluid pressure, means for producing a second fluid pressure, and means directly actuated by said servomotor at a predetermined point in the range of operation for modifying the first fluid pressure by said second fluid pressure.

2. A fluid pressure control system comprising in combination, means sensitive to the magnitude of a controlled condition for producing a first fluid pressure, a regulator having a predetermined range of operation for an agent affecting the condition normally under the control of the first fluid pressure, means for producing a plurality of fluid pressures; and means actuated by said regulator at predetermined points in the range of operation for successively rendering the last named fluid pressures effective for modifying the first fluid pressure.

3. A fluid pressure control system comprising in combination, regulating means for an agent effecting a controlled condition, supply means for said agent, a motor having a plurality of speeds for driving said supply means, means for producing a first fluid pressure representative of the magnitude of the controlled condition, means for producing a second fluid pressure representative of the speed of said motor, and means for producing a third fluid pressure representative of the relationship between the first and second fluid pressures for operating said regulating means.

4. A fluid pressure control system comprising in combination, regulating means of an agent, supply means for said agent, a variable speed motor for driving said supply means, means for producing a first fluid pressure, means for producing a second fluid pressure representative of the speed of said motor, and means for producing a third fluid pressure representative of the relation between the first and second fluid pressures for operating said regulating means.

5. A fluid pressure control system comprising in combination, regulating means of an agent, supply means for an agent, a variable speed motor for driving said supply means, means under the control of said regulating means for varying the speed of said motor, means for producing a first fluid pressure, means for producing a second fluid pressure representative of the speed of said motor; and a relay for producing a third fluid pressure in accordance with the relationship between the first and second fluid pressures for operating said regulator.

6. In a control system for apparatus supplied with a plurality of agents for maintaining a variable at a desired magnitude, in combination, means for producing a first fluid pressure in accordance with the magnitude of said variable, a fluid pressure relay having opposed chambers for producing a control pressure, a regulator for one of said agents governed by said control pressure, means for transmitting the first fluid pressure to one of said opposed chambers, means for establishing a second fluid pressure, a passageway for transmitting said second fluid pressure to the other of said opposed chambers; and a normally closed valve in said passageway opened upon an abnormal change in the rate of supply of one of said plurality of agents.

7. In combination, a duct, a multi-speed fan for producing a flow of fluid in said duct, a damper, a servo-motor for positioning said damper, means for establishing a first fluid pressure for controlling said servo-motor, means for establishing a second fluid pressure, and means under the control of said servo-motor for changing said fan speed when said damper reaches predetermined positions, and simultaneously modifying said first fluid pressure by said second fluid pressure to effect a change in the flow of fluid through said duct in opposite direction to that caused by the change in fan speed.

8. A fluid pressure-operated control system comprising a control couple having relatively movable elements for producing a loading pressure, means for relatively positioning said elements responsive to the magnitude of the controlled condition, a relay having opposed pressure chambers for producing a control pressure in accordance with the relationship between the pressures in the opposed chambers, a regulator for an agent affecting said condition positioned in response to changes in said control pressure, means for transmitting the loading pressure to one of the opposed chambers, and means under the control of said regulator for introducing a second fluid pressure into the other of the opposed chambers at predetermined positions of said regulator.

9. In combination, a duct, a fan connected to said duct, a multi-speed motor for driving said fan, a damper for controlling the flow of fluid through said duct, a pressure sensitive regulator for positioning said damper, a relay having a pressure sensitive chamber for producing a control pressure effective for actuating said regulator, means for establishing a plurality of pressures of predetermined values; and means for successively introducing said pressures into said pressure sensitive chamber upon successive changes in the same sense of the motor speed.

10. In a combustion control system for a vapor generator, in combination, means for producing a first fluid pressure in accordance with the pressure of the vapor, means for producing a second fluid pressure in accordance with the ratio between rate of vapor output and rate of air supply, regulating means for the rate of fuel supply responsive to changes in the first fluid pressure, air supply means having a plurality of rates of operation, regulating means for the air supply, means for producing a third fluid pressure in accordance with the rate of operation of said air supply means; and a relay for establishing a fourth pressure in accordance with the relationship between the first three named fluid pressures for controlling the operation of said air supply regulating means.

11. A combustion control system for a vapor generator, comprising in combination, a plurality of air supply means, a regulator for the rate of fuel supply, a regulator for controlling the rate of air supply associated with each of said air supply means, and means sensitive to failure of one of said air supply means for positioning the associated regulator to an extreme position and simultaneously positioning said fuel supply regulator.

12. In a combustion control system, in combination, a fan for supplying air, a motor having a plurality of speeds for driving said fan, a motor controller for changing the speed of said motor, a regulator of the air supply having a predetermined range of movement, means actuated by said regulator at predetermined points in its range of movement for operating said motor controller to change the speed of said motor, means for producing a first fluid pressure for controlling the operation of said regulator, means for establishing a second fluid pressure in accordance with the speed of said motor, and means for modifying the control of said regulator in accordance with the second fluid pressure so that upon change in speed of said motor said regulator is positioned in a direction to produce a change in air flow opposite to that caused by the change in speed of the fan driven by said motor.

13. In a combustion control system, apparatus for reducing the rate of fuel supply upon failure of the means supplying air for combustion, comprising, a fluid pressure operated regulator for controlling the rate at which fuel is supplied for combustion, means for supplying air for combustion, automatic apparatus for establishing a fluid pressure normally effective for operating said regulator of the fuel supply, means for establishing a second fluid pressure; means for normally maintaining said second fluid pressure inoperative to position said regulator of the fuel supply but actuated by failure of said air supply means to render said second fluid pressure effective to position said regulator of the fuel supply to thereby reduce the rate at which fuel is supplied.

HARRY E. WEAVER.